United States Patent [19]
Mestnik et al.

[11] Patent Number: 5,780,815
[45] Date of Patent: Jul. 14, 1998

[54] OIL-FREE FRYER, FOOD COOKER

[75] Inventors: Frank G. Mestnik, Alpharetta, Ga.; Billy J. Alexander, Des Plaines, Ill.

[73] Assignee: Air Fry, Inc., Indianapolis, Ind.

[21] Appl. No.: 649,797

[22] Filed: May 17, 1996

[51] Int. Cl.$^6$ .................................. A21B 1/26; F27D 7/04
[52] U.S. Cl. ..................... 219/400; 99/474; 99/479
[58] Field of Search .............................. 219/400; 99/474, 99/479; 126/21 A, 198; 426/236; 432/250

[56] References Cited

U.S. PATENT DOCUMENTS

| | | | |
|---|---|---|---|
| 3,168,642 | 2/1965 | Savio | 219/400 |
| 4,155,294 | 5/1979 | Langhammer et al. | 219/400 |
| 4,295,419 | 10/1981 | Langhammer | 219/400 |
| 4,374,318 | 2/1983 | Gilliom . | |
| 4,491,065 | 1/1985 | Poulson | 126/21 A |
| 5,066,851 | 11/1991 | Darvin . | |
| 5,148,737 | 9/1992 | Poulson | 126/21 A |
| 5,193,444 | 3/1993 | Bar-Sheshet | 219/400 |
| 5,417,198 | 5/1995 | Williams et al. | 126/21 A |
| 5,483,044 | 1/1996 | Thorneywork et al. | 219/400 |
| 5,545,874 | 8/1996 | Hansson | 219/400 |

*Primary Examiner*—Teresa J. Walberg
*Assistant Examiner*—J. Pelham
*Attorney, Agent, or Firm*—Woodard, Emhardt, Naughton Moriarty & McNett

[57] ABSTRACT

A rotatable two-piece basket assembly is behind upper and lower doors in a blower driven recirculating hot air oven. An electric heater directly adjacent a catalytic converter directly above the cooking chamber, removes contaminants. The lower basket is removed through the lower door opening, while the upper door stays closed to conserve heat. A homing control homes the basket assembly whenever the door is opened or a cooking cycle is completed, for removal of the lower basket. A filter at the blower inlet is removable through the lower doorway when the lower basket is out, for cleaning or replacement. The blower wheel is removable through the lower doorway when the filter assembly has been removed. The upper basket is removable through the combined doorway by a push-and-turn motion applied to a bayonnet connection to the basket drive shaft. Other components are then removable through the front opening. The basket drive shaft and lower basket have cooperating features to guide, align and support the lower basket for ease of installation and removal. The controller assembly is removable from the top as a module.

10 Claims, 8 Drawing Sheets

OIL-FREE FRYER, FOOD COOKER

BACKGROUND OF THE INVENTION

1. Field of the Invention

This invention relates generally to cooking equipment, and more particularly to a high velocity forced hot-air cooking oven.

2. Description of the Prior Art

For many years, French-fried foods have been very popular and have been marketed extensively by the restaurant industry, particularly by so-called fast-food restaurants. The desire to reduce or eliminate hot oil, grease and fat from cooking equipment in the interest of safety, and to reduce or eliminate the content of such materials in the cooked foods, has led to adoption of counter-top cooking ovens which force hot air directly onto the food products to cook them. A couple of examples of patents pertaining to such cooking equipment are U.S. Pat. No. 4,374,318 issued Feb. 15, 1983, and U.S. Pat. No. 5,066,851 issued Nov. 19, 1991. In spite of the advantages of such equipment over deep-fat fryers, there remains a need for improvement. The present invention is directed to meeting that need.

SUMMARY OF THE INVENTION

According to a typical embodiment of the invention, a cooker using forced hot air has a two-piece basket assembly rotatable in a cooking chamber behind upper and lower front doors of the chamber. A hot air supply plenum in the chamber has an outlet covering an area of the basket surface. An air return path has an inlet at the rear of the chamber, with a blower wheel taking air from the inlet and discharging it through a duct to a heater chamber above the oven chamber. The hot air supply plenum has a heater assembly mounted above it and projecting into the heater chamber. A catalytic converter mounted immediately below the heater assembly, is exposed to radiant heat from the heater. Air is moved by the blower from the oven chamber through the duct to the heater chamber, down through the heater assembly and the catalytic converter and the supply plenum to the rotating basket assembly and then to the blower inlet. Upper and lower front doors are provided, the lower door being opened for installation and removal of the lower basket of the food basket assembly, while the upper door remains closed to conserve heat. A homing control returns the basket assembly to home position whenever the door is opened or a cooking cycle is completed, to facilitate removal of the lower basket. A filter assembly is readily removable through the lower door opening when the lower basket is out, to facilitate cleaning or replacement of the filter assembly. The blower wheel is readily removable through the lower door opening when the filter assembly has been removed. The upper basket assembly can be readily removed through the door openings by a push-and-turn motion. The supply plenum, together with heater assembly and catalytic converter can be readily removed through the front door openings for servicing. The controller assembly can be removed from the top as a module.

DESCRIPTION OF THE PREFERRED EMBODIMENT

Figure 1:
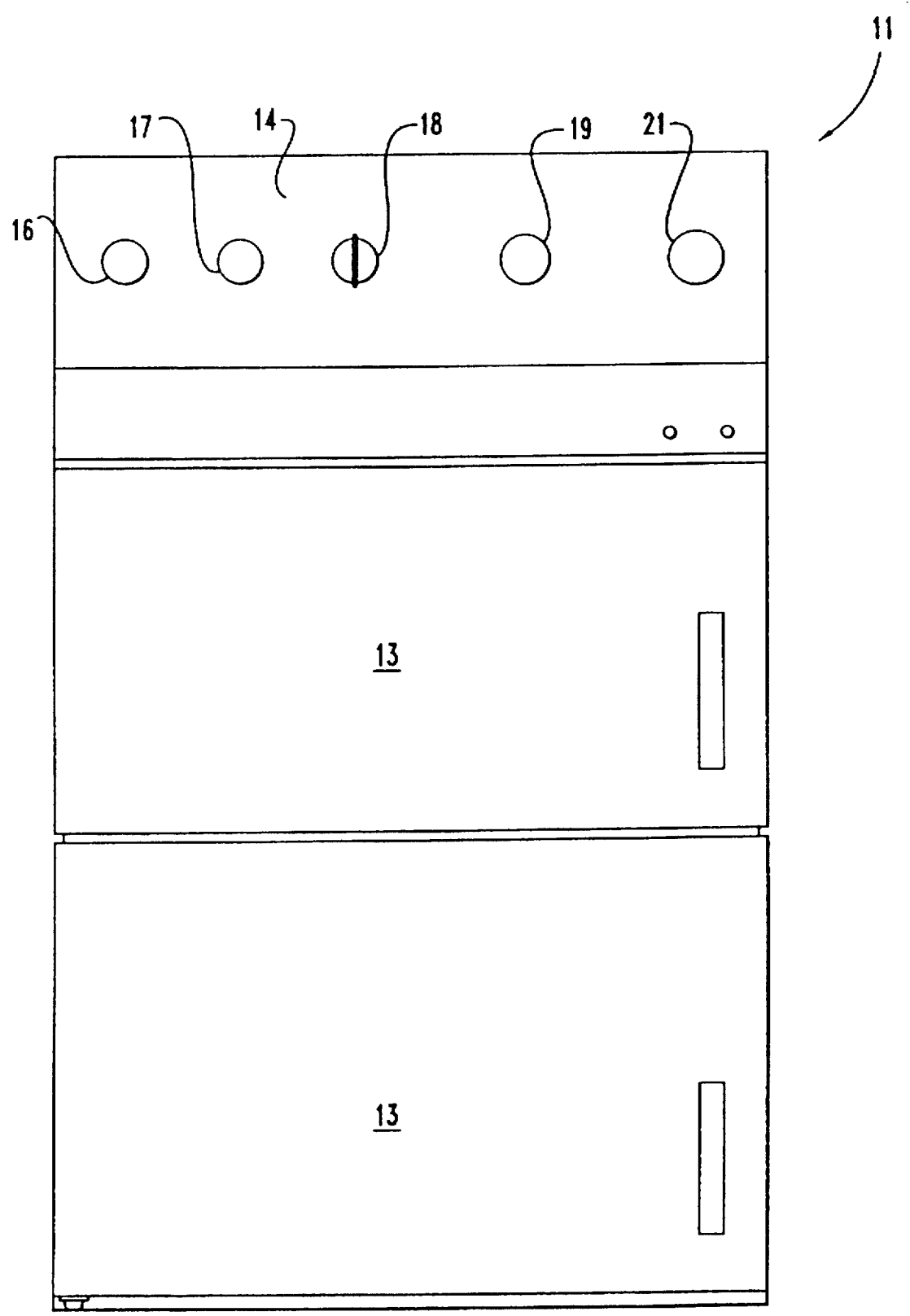
FIG. 1 is a front elevational view of the oven according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The typical external configuration of the cooker 11 is rectangular as shown in FIG. 1, of a width (about 15.5 inches) from side-to-side such as to conveniently fit the space that would normally be occupied by a deep-fat fryer. Also, for convenience of the user, the unit is intended to be mounted at counter-top level such as 36 inches, and its overall height to the top of the control panel is about 28 inches. As shown in FIG. 1, the cooker 11 has lower and upper front doors 12 and 13, each hinged at the left and having a latch operating handle at the right. The control panel 14 in the illustrated embodiment has a start time knob 16, stop time knob 17, combined "OFF" and basket rotation speed knob 18, start button 19, and dual temperature selection knob 21. The upper door 13 has a down-turned flange 22 immediately inside the lower door 12 so that the upper door cannot be opened unless the lower door is first opened. The primary seals between the doors and the cooking chamber inside the oven are stainless steel strip seals riveted to the doors and engaging the front of the oven chamber around the perimeter at face 23.

Except for the nature of the seal and the flange 22, and the construction of the doors to resist high temperatures in the oven, the hinged mounting and operation is similar to that of a double door refrigerator.

The illustrated oven chamber is generally cubical in configuration with a vertical rear wall 26, a horizontal floor 27 and ceiling 28, and parallel vertical left and right side walls 29 and 31.

Figure 7:
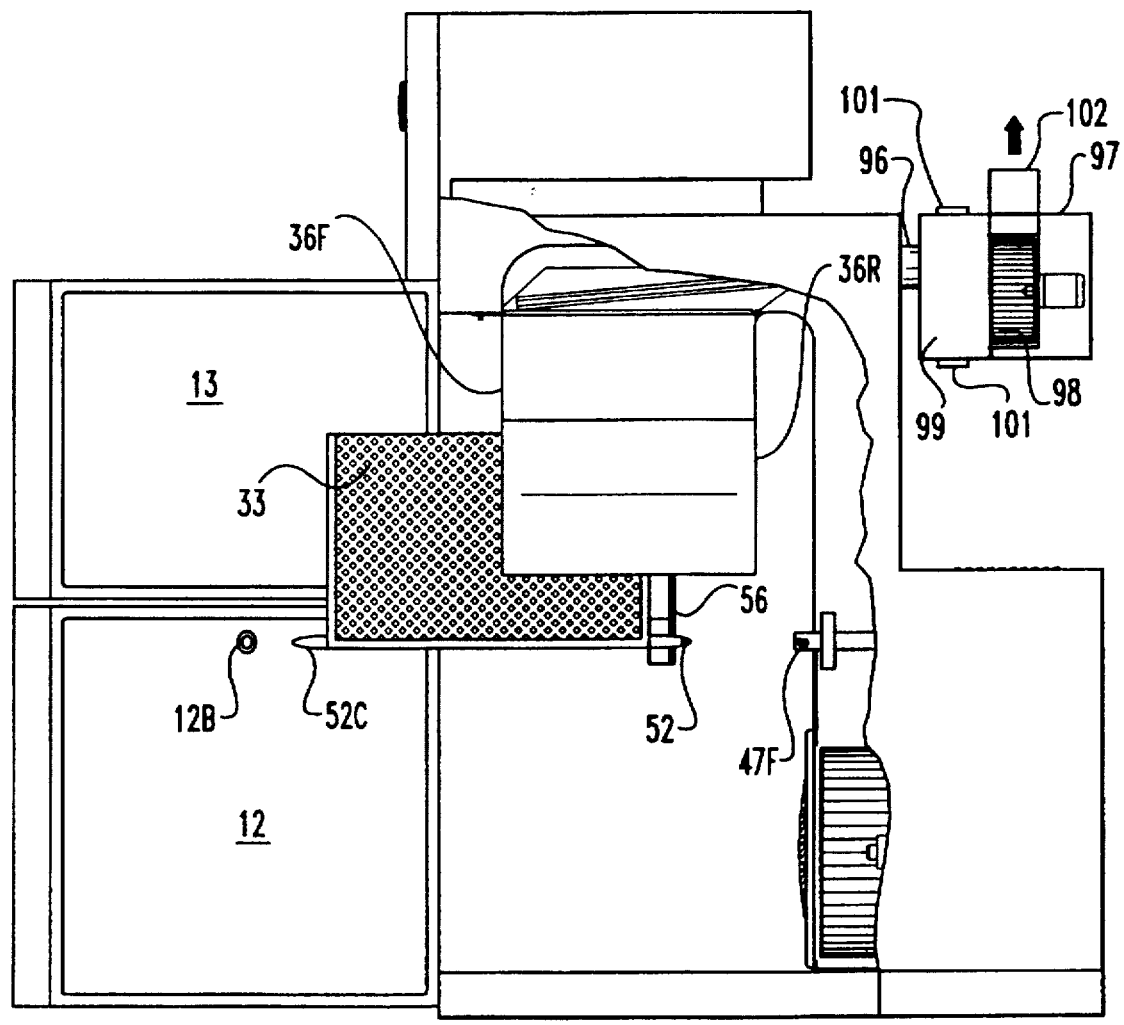
FIG. 7 is a sectional view showing modular components being removed from the oven.

There is a two-piece basket assembly 32 including the upper basket 33 and lower basket 34 mounted for rotation together in the chamber. A hot air supply plenum 36 is fastened to the top 28 of the chamber and has parallel vertical front and rear walls 36F and 36R (FIG. 7) with semi-circular lower edges on each wall such as 36L (FIG. 2) closely spaced from the outer cylindrical surfaces 33S of the upper basket and 34S of the lower basket as the basket assembly rotates. These front and rear walls cooperate with the left and right side walls of the plenum, whose lower edges 36B are straight and parallel to the rotational axis 37 of the basket assembly. Crumb collection pan 38 rests on the floor 27 of the chamber.

Figure 3:
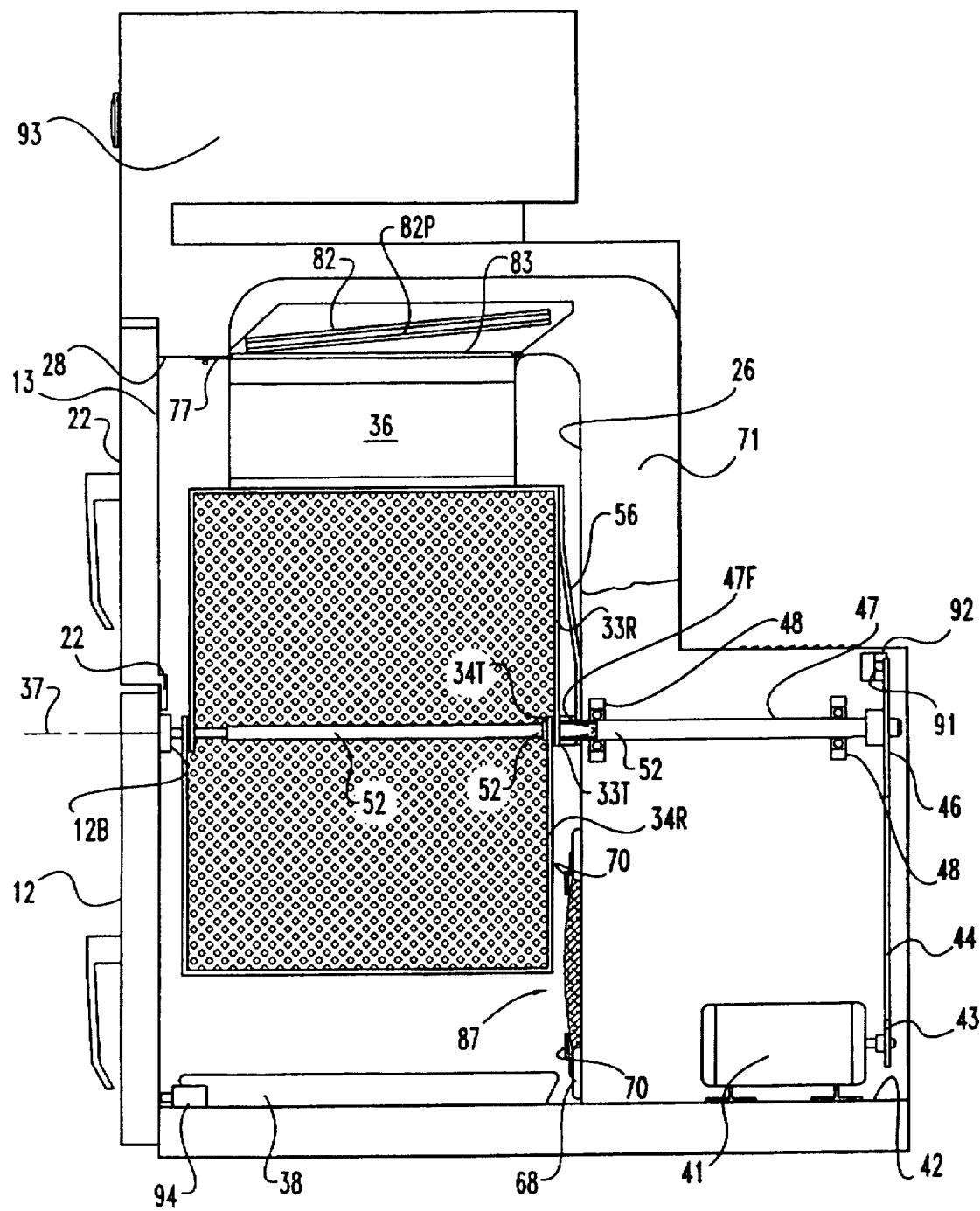
FIG. 3 is a vertical section through the oven taken at lines 3—3 in FIG. 2 and viewed in the direction of the arrows.
Figure 8:
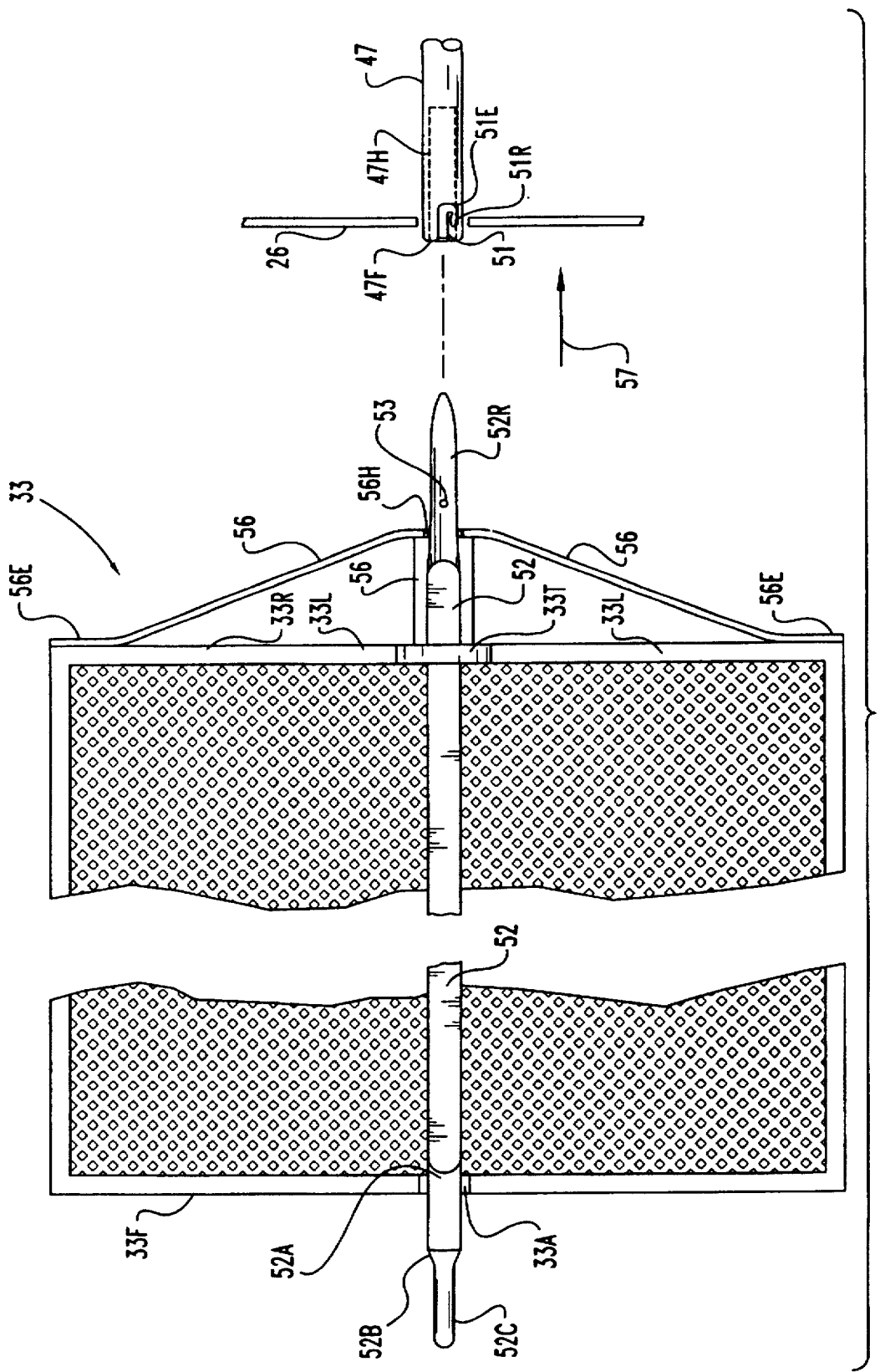
FIG. 8 is a fragmentary exploded view showing upper basket to drive shaft connection and support shaft features.

Referring now to FIG. 3, a basket drive motor 41 is fastened to the floor 42 of the cabinet and drives the sprocket 43, driving a chain 44 which drives the sprocket 46 to which is fastened the basket drive shaft 47 mounted in bearings 48 in the cabinet. The shaft 47 has a front end 47F extending slightly into the chamber 32 immediately in front of the rear wall 26 of the chamber. As shown in FIG. 8, the shaft 47 has a hole 47H extending rearward from the front end 47F into the shaft about 4 inches. There is a U-shaped bayonet slot 51 in the wall of the shaft 47 extending rearward from the front end 47F of the shaft. Hole 47H receives the rear end of the basket shaft 52, as will be described.

Referring further to FIG. 8, the front and rear end portions of the upper basket 33 are shown as viewed from the bottom, with the center broken out to conserve space in the drawing. The basket shaft 52 has a square cross section throughout most of its length, but the rear portion 52R is round for about four inches and has a round pin 53 projecting radially from one side near the end. The front portion of the shaft 52 is stepped from the square portion to a round portion 52A to a tapered portion 52B down to a round portion 52C, which is received in a door mounted bearing journal 12B welded to the inside face of the lower door 12. The front end wall 33F of upper basket 33 is closed and has a straight lower edge with an arcuate notch 33A spaced from the cylindrical portion 52A of the shaft 52. The rear end wall 33R has a straight lower edge 33L and a downwardly projecting tab 33T with a square hole at the center snugly receiving the shaft 52, whereby rotation of the shaft 52 by shaft 47 rotates the basket 33. There is a stainless steel stamping comprising an array of three arms 56 at the rear of the basket, each of the arms having its outer end 56E welded to the rear wall 33R of the basket. The third arm is partially hidden in FIG. 8 of the drawing, as it is directly above the shaft. The junction area of the third arm with the other two arms 56 (which are omitted in FIG. 3) has a hole 56H in the center to permit the center portion of the array to resiliently move in and out axially with respect to the rear wall 33R of the basket. Thus, this array serves as a spring.

The diameter of the basket shaft rear end portion at 52R, and the inside diameter of the shaft end receiver hole 47H in basket drive shaft 47 are sized for a close slip fit so that the basket shaft can be installed by insertion into the hole in the direction of the arrow 57, with the pin 53 received in the slot 51, whereupon the basket is turned in a clockwise direction to lock into the bayonet slot. As the shaft 52 is inserted, the arms 56 are deflected by engagement of the central portion thereof against the rear wall 26 of the oven chamber. When the basket shaft 52 has been pushed in and is turned, it thereby turns the pin 53 in the curved portion of the bayonet slot. After passing the middle of the "U" at 51E, and upon release of the basket, the spring arms will push the basket forward so that the pin 53 is then securely retained in the closed end 51R of the slot. Therefore, the upper basket 33 is secure in the shaft 47 and is supported thereby in cantilever fashion from shaft 47 and securely enough to be able to support not only the upper basket, but also the lower basket, even when the food to be cooked is in the lower basket, as will be described. Additional support for the assembly is provided by the bearing 12B in the door which, when the door is closed, moves into position around and in supporting engagement of the shaft front end 52C.

Figure 6:
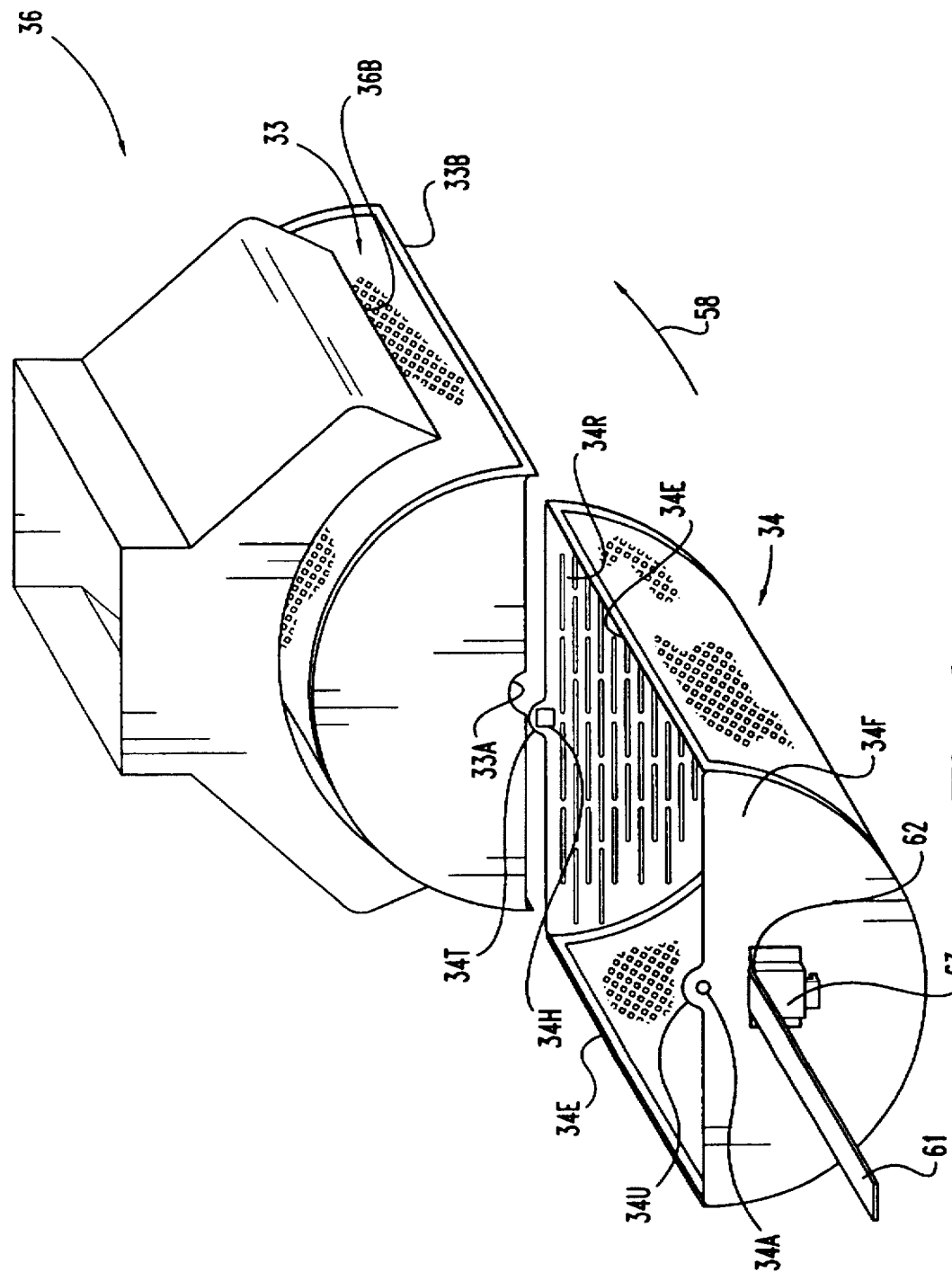
FIG. 6 is a perspective view showing the relationship of the baskets when the lower basket has been fully separated from the upper basket shell.

As shown best in FIG. 6, the lower basket 34 has a perforated rear end wall 34R with an upwardly extending tab 34T with a square hole 34H in it. The front end wall 34F is solid as is that of the upper basket and has an upwardly extending tab 34U with a round hole 34A in it. The two holes in the lower basket enable the basket to be received on and support by the basket shaft 52. As the lower basket is mounted by moving it in the direction of arrow 58 (FIG. 6) the notch 33A in the front of the upper basket enables passage of the tab 34T as the square hole 34H moves along shaft 52. After the lower basket has advanced to the rear along the shaft, then the front end of the shaft is received through the hole 34A in the front tab 34U to thereupon support the front end of the basket 34 on the shaft portion 52A. As this occurs, the upper edges 34E of the lower basket frame will be received immediately against the lower edges 33B of the upper basket frame. The advance of the lower basket in the direction of arrow 58 in FIG. 6 will stop upon contact of the tab 34T with the inside face of the rear end wall 33R of the upper basket and simultaneous contact of the tab 34U with the front wall 33F of the upper basket, outboard of the notch 33A. The notch 33A is large enough to admit the tab 34T on the rear of the lower basket, but smaller than the tab 34U at the front of the lower basket, so that the notch 33A is closed upon assembly of the two baskets. Also, the close relation of the frame edges 33B of the upper basket with the frame edges 34E of the lower basket will prevent leakage of the food product to be cooked, from the joints at the sides, while leakage at the ends is prevented by the close contact between the lower and upper edges respectively of the upper and lower basket end walls.

To facilitate installation and removal of the lower basket, a removable handle 61 is provided and has a down-turned mounting leg 62 at the rear end and which is slidably received downward in the handle receiver bracket 63 which is channel shaped with side flanges 63F spot welded to the front wall of the lower basket. A tab 62R at the bottom of leg 62 is received in hole 63S in the front wall 34F of the basket. Because of the mounting features of the handle and bracket, the handle is readily removed from the basket 34 by simply lifting the front end of the handle when the basket has been installed on shaft 52. This tilts the leg in the bracket enough to remove tab 62R from hole 63S so the leg can be slided up and out of the bracket 63. Yet, because of the nature of the mounting of the handle to the basket wall, the handle can be used to turn the basket over for dumping the contents after cooking, without the basket separating from the handle. Then, when a new batch of food product is placed in the basket, the basket can be reinstalled in the assembly, the handle removed, and the door closed.

Figure 4:
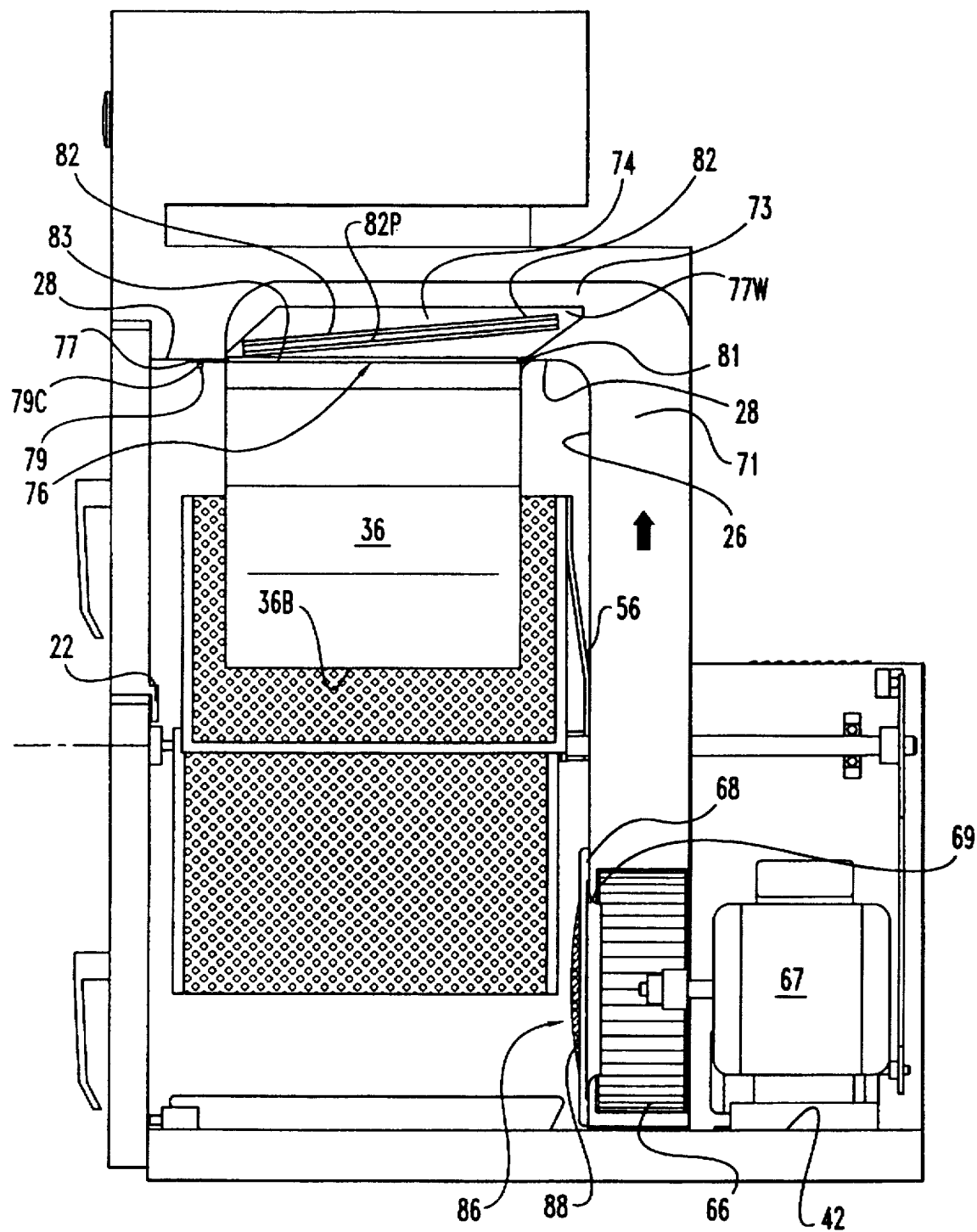
FIG. 4 is a view similar to FIG. 3 but taken at line 4—4 in FIG. 3 and showing air circulation features.

Referring now to FIG. 4, where the section is taken on a plane containing the axis of the blower assembly, a blower wheel 66 is mounted on the shaft of blower drive motor 67 which is mounted on the floor 42 of the cabinet. A blower inlet opening is provided in wall 26 and covered by a plate 68 having an inlet ring 69 extending through the opening into the blower wheel 66. The plate also has upper and lower channels 70 on its front side whereby it serves as a filter mounting frame. The blower discharges into the duct 71 on the back side of the oven wall 26. The flow path makes a forward turn in top duct 73 to the heater chamber 74. The opening from this heater chamber is a hole 76 in the ceiling 28 of the oven chamber.

The plenum 36 has a horizontal plate 77 secured to its top and which has upturned side walls 77W received up through hole 76 into chamber 74. The front of plate 77 has two holes receiving a couple of fixed studs 79 projecting down from the ceiling 28 of the oven chamber. A couple of spring clips 79C installed on the studs under the plate, hold the plate up on the studs. Horizontally extending notches 81 in plate walls 77W at the rear of plate 77, receive the rear edge of the oven chamber roof and support the plenum assembly at the rear. The portion of plate 77 inboard of ceiling opening 76 is open to allow free flow of air from chamber 74 down into plenum 36. A set of eight, horizontally-spaced electric heating coils 82 is mounted on a mounting frame 82P of mica plate material mounted to side walls 77W and spaced above a catalytic converter 83 so that air flowing up through the duct 71 and forward into the heater chamber 74 can pass down through the heating coils and the catalytic converter into the plenum 36.

The cylindrical walls of the upper and lower baskets are 20 gauge perforated stainless steel shells perforated with 0.156 inch diameter holes on 0.187 inch staggered centers. The shells are welded to the basket frames of stainless steel wire. Air flowing down from the plenum 36 can pass through the basket walls into the inside of the baskets. The rear end walls of the upper and lower basket are perforated with horizontal slots (0.125×2.00 on 2.25×0.25 inch spacing) as shown in FIG. 6, for both the lower basket rear wall 34R and likewise for the upper basket rear wall 33R so that, as the basket assembly is rotated by the shaft 52, air can pass through the basket assembly, through a filter assembly 86 and the associated blower inlet ring 69 into the blower wheel 66. The blower is sized and powered so that there is a high volume (550–600 CFM) delivered, and air is delivered at high velocity from the plenum 36 into the basket assembly.

Figure 2:
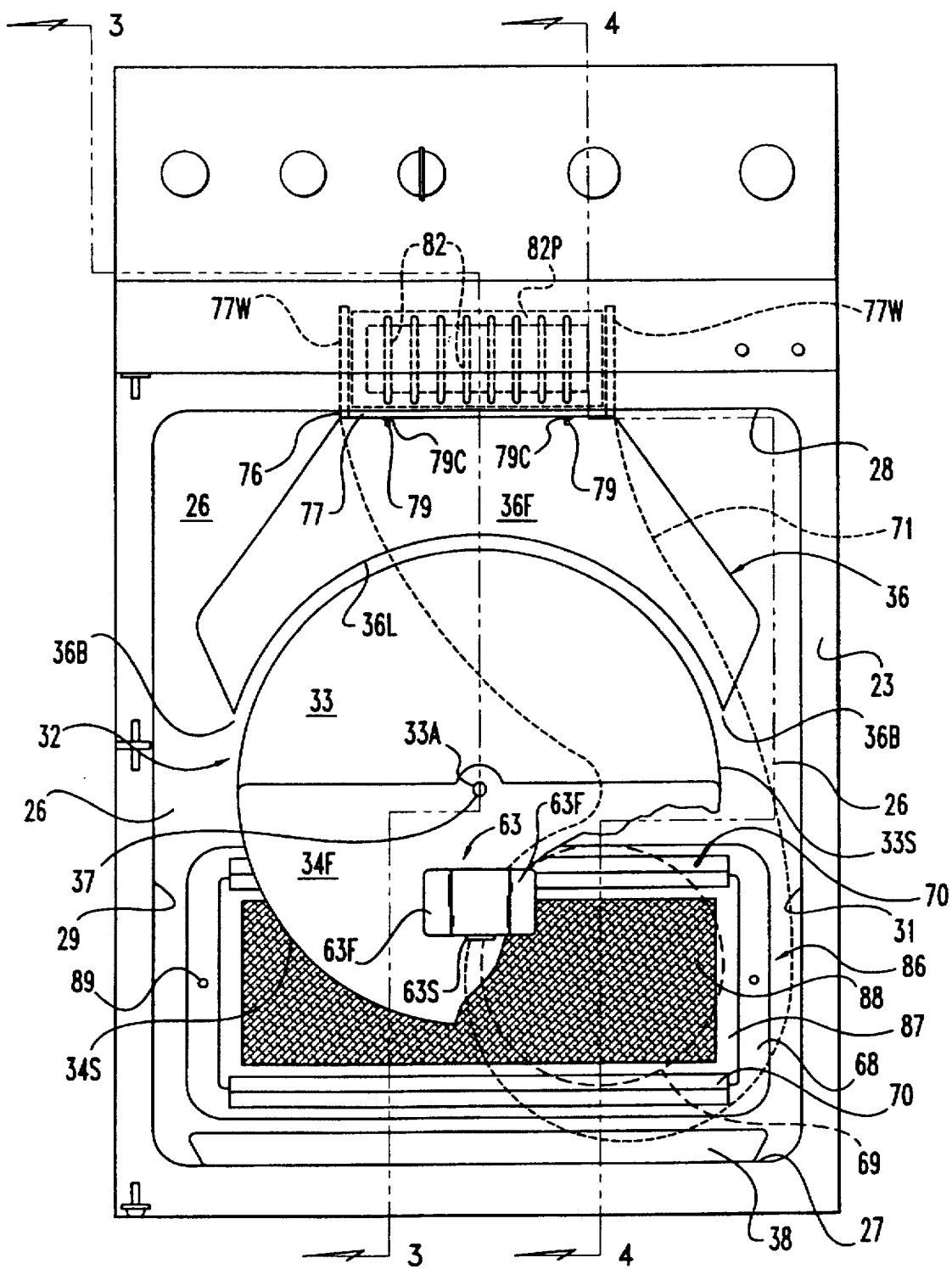
FIG. 2 is a front elevational view with the door open.

As shown in FIGS. 2 and 3, the filter assembly 86 is mounted in channels 70 and includes a frame 87 and filter media 88 and which is typically multiple layers of 300 series stainless steel filter medium. The filter assembly is removably mounted in the blower inlet ring frame 68, 69, 70 which is mounted against the back wall 26 of the oven chamber by reception of the frame 68 on two studs 89 projecting forward from the rear wall 26 of the chamber through an aperture at each side of plate 68. The plate is secured by a couple of retainer spring clips pushed onto the studs and latching in grooves in the studs. This attachment is of the same nature as the attachment of the front of the heater mounting plate 77 at studs 79 in the oven ceiling.

There is a provision for the basket assembly to return to "home" position for the load-unload functions, when either of two events happen. One is the end of the cycle. The other is the opening of the door 12 before the end of the cycle. For this homing feature, there is a sprocket 46, previously mentioned, and which has a cam 91 (FIG. 3) mounted on it and which operates a limit switch 92 mounted in the cabinet. This switch will be activated when the sprocket indicates that the basket is in the correct home position for loading and unloading. The controller designated generally at 93 in the upper cabinet behind the control panel, has an input from a limit switch 94 associated with the door 12 so that, if the door is opened the slightest, the controller will continue to operate the basket drive motor until the limit switch 92 has been activated by the cam on the sprocket 46, thus indicating to the controller that the baskets are at home and whereupon the motor 41 stops.

The catalytic converter 83 is located so that it is exposed at its top entirely to the radiant area of the heaters. Therefore, even if the air temperature of the air moving through the oven has not risen to a temperature sufficient to activate the catalytic converter (about 600° F.), the converter will be activated by the radiant heat from the heater so that it functions. Similarly, when the overall temperature of the oven is decreasing due to the thermostat not calling for more heat from the heater, there is still heat being generated by the catalytic converter for some period of time after the heater turns off.

Another important feature of the invention is the modular construction for ease of maintenance and service. It was already noted that the removal of the lower basket for filling and dumping food product is done easily by simply opening the lower door, installing the handle, and pulling out the basket. Removal of other components is quite easy as well. For example, to remove the upper basket, it is only necessary to open the upper door, push the basket in against the spring load, turn it counterclockwise and pull it out. Then, removal of the plenum 36 can be accomplished by simply removing the spring clips from the studs at the front of the mounting plate 77, lowering the front of plate 77 from the two studs, pulling the plenum 36 forward to disengage the notches 81 from the ceiling 28 at the rear edge of opening 76, and continuing to lower the plenum assembly and pull it out of the front doorway. This provides easy access to the heater coils and catalytic converter, because they remain mounted to the removed plenum.

The filter assembly 86 can be removed readily without even opening the upper door, by simply pulling out the lower basket, removing the spring clips from the studs on the back wall and pulling the filter mounting frame and blower inlet ring plate 68 with the filter assembly on it, out through the lower door, whereupon the filter assembly can be slided out of the frame for cleaning. Then the blower wheel can be removed by simply inserting a screw driver into a slot in the front end of the blower motor shaft and unscrewing the blower wheel retainer nut from the motor shaft. All of these filter and blower components can be readily removed through the lower front door of the cooker. Similarly, the control unit can be lifted off the top of the cooker and replaced as a complete unit.

All food contacting surfaces as well as those in the oven chamber are preferably made of stainless steel type 304. In addition to the aforementioned mechanical seals for the doors, some non-metallic soft seal materials may be used in lower temperature areas at the outside edges of the doors. The inside dimensions of the over chamber are typically 12 inches wide, 11¾ inches deep and eighteen inches high. The size and particular configuration of the chamber may be different for different capacities of the oven and for ovens where different manufacturing techniques may be used. The blower wheel may be formed of 300 series stainless steel, 5 inches in diameter and 2½ inches wide with forward curved blades. The heater assembly is made of a plurality of coils as indicated, of NiChorme wire secured to the mounting bracket by welded-on ring terminals and a machine screw/ nut assembly. A solid ceramic rod is inserted in each of the coils throughout its length to provide support. The catalytic converter 83 is a magnesium alumino-silicate material located below the heater cores and measuring 6"×6" on the sides and ½" thick, with 64 holes per square inch in its faces. It sits on a grill in the top of the plenum 36 immediately below the heater coils.

The baskets are made of 300 series stainless steel for the frames and for the front and rear end walls welded to the frames, and for the semi-cylindrical perforated metal shells mounted to the frames. The hot air is delivered down from the catalytic converter in plenum 36 through the perforated shell walls of the two baskets as they rotate together, and exits through the rear walls and the filter at the back of the chamber and is returned from the blower wheel through the duct up behind the back wall of the oven chamber to the horizontal duct at the top and back down through the heater coils and catalytic converter.

Figure 5:
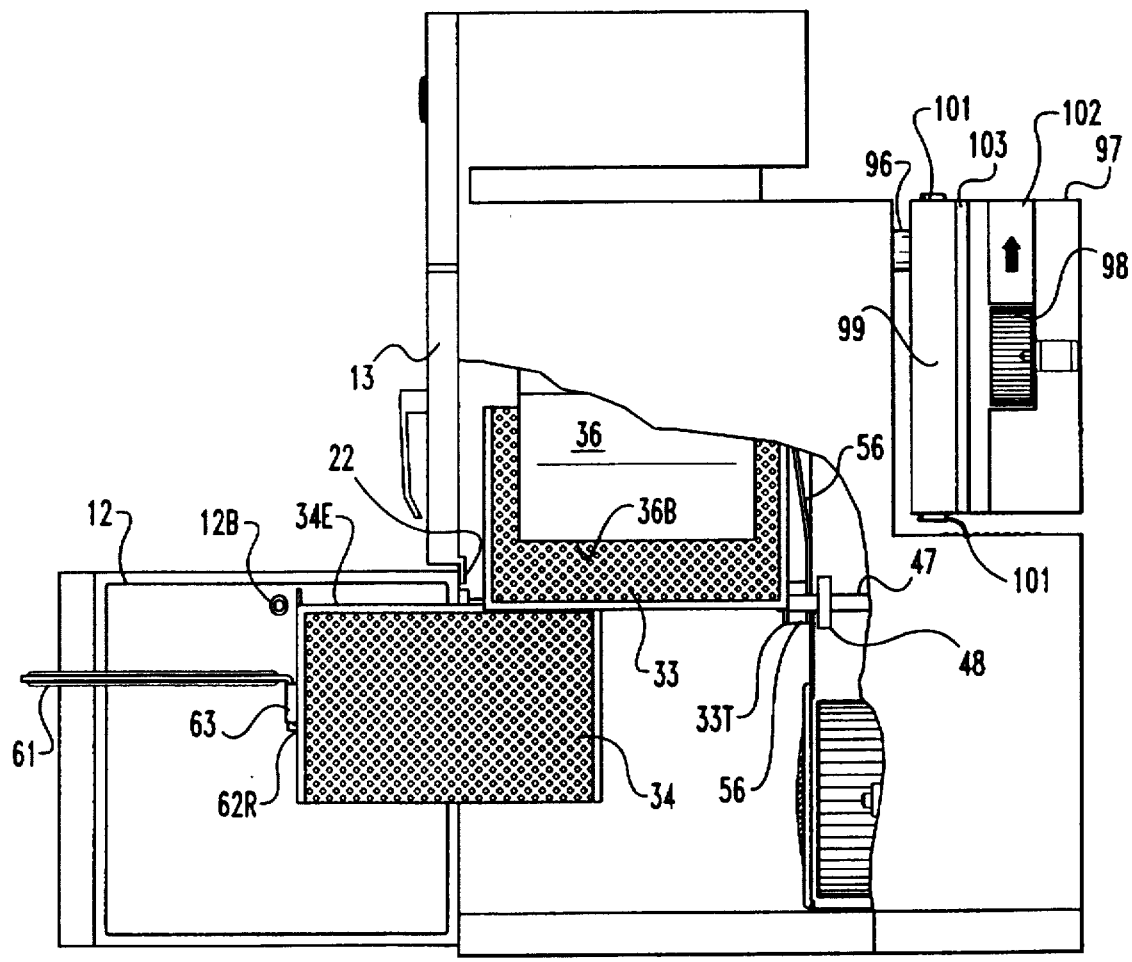
FIG. 5 is a fragmentary section similar to FIG. 3 and showing the lower door open and lower basket being removed.

This cooker has an exhaust pipe 96 (FIGS. 5 and 7) from the back wall near the ceiling of the oven chamber. A box 97 mounted to the back of the cabinet contains a small exhaust fan. An inlet chamber 99 receives the exhaust pipe 96. It also has one or more ambient air inlet openings 101. This air intake provision upstream of the exhaust fan allows some ambient room air to be mixed with hot exhaust air at 600° F., for example, to reduce exhaust temperature below 200° F. as it enters the fan for delivery from the fan at 102 to the outdoors or to an exhaust hood, where available. In the FIG. 5 version, a filter 103 is included in chamber 99 to clean the exhaust products so the fan can discharge directly into the room. The small exhaust fan can provide a negative pressure in the cooking chamber if needed at any time to prevent any smoke leakage from around door seals.

If desired, a paddle can be employed inside the top basket from the front end to the rear end of the basket and extending about one inch radially inward from the outside shell, to enhance tumbling of all food product in the basket assembly as it is rotated.

The controller is arranged so that any time the door is opened, the switch operates and will de-energize the heater and maintain rotation of the basket assembly until it reaches home position to enable withdrawal of the lower basket without opening the upper door. Consequently, heat in the upper portion of the oven is retained, and there is no blast of hot air in the face of the operator when only the lower door is opened to remove the lower basket.

Materials and dimensions are given above as examples of some features. As further examples, the blower motor may be a Leeson Model SPR950406.01 rated at ¼ horsepower and operable at 2850 or 3450 rpm. The basket drive motor may be a Baldor Model GPP231109, ninety volt DC gearmotor, normally operating at 28 rpm and having variable speed controller and the sprocket and chain system to rotate the basket at 2 to 10 rpm. Motor speed adjustment as by panel control knob 18, for example, is provided for different basket rotation speeds for certain types of cooking. It should be understood that construction features such as double walls and insulation, for example, are not specifically shown or described here, as they use well known techniques. Similarly, the wiring and circuits for interlocks and the basket housing feature of the invention are not detailed, as they are within the skill of the art, now that the function is described.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A hot air cooker comprising:

a cooking chamber having a front, a back and a ceiling;

an opening in the front with a door covering at least part of the opening;

a food holder basket assembly in the chamber behind the door and having an outside surface;

a gas flow duct extending from an inlet at said back to an outlet at said ceiling and having an air mover therein moving cooking fumes from the cooking chamber through said inlet toward said outlet;

a heater in the duct adjacent the ceiling outlet;

the basket assembly having two baskets rotatable together as a unit in the chamber while the air mover causes hot gas flow from the outlet through the basket assembly;

a drive shaft having a front end adjacent the back of the chamber and a first connector at the front;

the two baskets including an upper basket and a lower basket, the baskets having front and rear ends, and the upper basket having a mounting shaft with a front end and a rear end and a second connector adjacent the rear end of the mounting shaft engaging the first connector and connecting the mounting shaft to the drive shaft, the mounting shaft extending out beyond both ends of the lower basket.

2. The cooker of claim 1 and wherein:

the lower basket is slidably received on the basket mounting shaft.

3. The cooker of claim 1 and wherein:

the upper basket has a spring assembly thereon to facilitate locking the basket mounting shaft to the drive shaft.

4. The cooker of claim 3 and wherein:

the first and second connectors are cooperating bayonnet-type connectors; and the spring assembly engages the back of the cooking chamber and urges the upper basket assembly toward the front of the chamber to maintain a locking engagement of the first and second bayonnet connectors.

5. The cooker of claim 1 and wherein:

the lower basket has a front wall and a back wall and an aperture in the front wall and an aperture in the rear wall, the mounting shaft being received through both apertures whereby the lower basket is aligned with and coupled to the upper basket and closes the basket assembly.

6. The cooker of claim 5 and wherein:

the lower basket has an aperture shape at the rear wall; and the mounting shaft has a cooperating shape, the shapes non-rotationally cooperating such that, when the lower basket is moved into the cooking chamber it is aligned with and coupled to the upper basket and closes the basket assembly.

7. The cooker of claim 6 and wherein:

the upper basket has a front wall and a rear wall and is connected to the mounting shaft at the rear wall, the front wall having a lower edge spaced from the mounting shaft;

the front wall of the lower basket having a portion projecting toward said lower edge, with the said aperture in the front wall of the lower basket being in the projecting portion.

8. The cooker of claim 2 and wherein the baskets have front end walls and rear end walls, the cooker further comprising:

a second door covering another part of the front opening, the second door being below the first-mentioned door, the first-mentioned door being in front of the upper basket, and the second door being in front of the lower basket, the lower basket being removable from the cooking chamber through the portion of the front opening normally closed by the second door, without opening the first-mentioned door.

9. The cooker of claim 8 and further comprising:

a handle receiver on the front end wall of the lower basket;

a handle having one end mounted in the receiver for removing the one basket from the chamber through the portion of the front opening normally closed by the second door, independently of the other basket.

10. The cooker of claim 9 and wherein:

the handle has a downturned leg with a forward tab thereon, the basket having a hole receiving the tab when the handle leg is received in the receiver, to retain the handle in the basket.

* * * * *